US011388076B2

(12) United States Patent
Matsuda et al.

(10) Patent No.: US 11,388,076 B2
(45) Date of Patent: Jul. 12, 2022

(54) RELAY DEVICE AND RELAY METHOD

(71) Applicant: Nippon Telegraph and Telephone Corporation, Tokyo (JP)

(72) Inventors: Akira Matsuda, Tokyo (JP); Hitoshi Irino, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/268,784

(22) PCT Filed: Aug. 7, 2019

(86) PCT No.: PCT/JP2019/031041
§ 371 (c)(1),
(2) Date: Feb. 16, 2021

(87) PCT Pub. No.: WO2020/039921
PCT Pub. Date: Feb. 27, 2020

(65) Prior Publication Data
US 2021/0344583 A1    Nov. 4, 2021

(30) Foreign Application Priority Data
Aug. 21, 2018  (JP) .............................. JP2018-154421

(51) Int. Cl.
*H04L 43/10*    (2022.01)
*H04L 43/065*    (2022.01)

(52) U.S. Cl.
CPC ............ *H04L 43/10* (2013.01); *H04L 43/065* (2013.01)

(58) Field of Classification Search
CPC ............................... H04L 43/10; H04L 43/065
See application file for complete search history.

(56) References Cited

U.S. PATENT DOCUMENTS 6,978,302 B1 * 12/2005 Chisholm ............. H04L 41/046
                                                    370/242
7,009,941 B1 *  3/2006 Uchino ................... H04L 45/02
                                                    370/254
(Continued)

FOREIGN PATENT DOCUMENTS

| JP | 2004-152320 | 5/2004 |
| JP | 2006-140671 | 6/2006 |
| JP | 2014-86859  | 5/2014 |

OTHER PUBLICATIONS

Waldbusser et al., "RFC 2790—Host Resources MIB," Network Working Group, Mar. 2000, 51 pages.

*Primary Examiner* — Jerry B Dennison
(74) *Attorney, Agent, or Firm* — Fish & Richardson P.C.

(57) ABSTRACT

Monitoring for preventative maintenance using Simple Network Management Protocol (SNMP) polling suitable for a large scale network is realized. A controller of the present invention for use in a system that monitors a plurality of monitored apparatuses by SNMP polling includes a request duplication unit that duplicates an SNMP request from an operator terminal, and a request transmission unit that transmits the duplicated SNMP requests to the monitored apparatuses all at once. The controller includes a response calculation unit that calculates an operator response value from a response value of the monitored apparatus which is retained in an apparatus information database (DB) according to a monitoring policy retained in a monitoring policy DB.

6 Claims, 3 Drawing Sheets

(56) References Cited

U.S. PATENT DOCUMENTS

| | | | | |
|---|---|---|---|---|
| 7,093,008 B2* | 8/2006 | Agerholm | H04L 41/0213 | 709/223 |
| 7,587,476 B2* | 9/2009 | Sato | G06F 3/1204 | 709/204 |
| 7,853,538 B2* | 12/2010 | Hildebrand | H04L 41/16 | 706/1 |
| 8,196,114 B2* | 6/2012 | Diao | G06Q 10/10 | 717/128 |
| 8,204,978 B2* | 6/2012 | Parks | H04L 67/16 | 709/224 |
| 8,527,616 B2* | 9/2013 | Kitani | H04L 41/12 | 709/223 |
| 8,799,437 B1* | 8/2014 | Kumbhari | H04L 41/0213 | 709/223 |
| 10,771,345 B1* | 9/2020 | Louca | H04L 41/14 | |
| 2002/0062366 A1* | 5/2002 | Roy | H04L 41/0213 | 709/224 |
| 2003/0101236 A1* | 5/2003 | Ohara | H04L 41/22 | 709/218 |
| 2005/0053016 A1* | 3/2005 | Kawai | H04L 41/046 | 370/254 |
| 2005/0243739 A1* | 11/2005 | Anderson | H04L 29/12783 | 370/254 |
| 2006/0010232 A1* | 1/2006 | Page | H04N 1/32529 | 709/223 |
| 2007/0011354 A1* | 1/2007 | Ohara | G06F 3/1222 | 709/245 |
| 2008/0082661 A1* | 4/2008 | Huber | H04L 41/0681 | 709/224 |
| 2008/0175172 A1* | 7/2008 | Nishi | H04L 45/48 | 370/256 |
| 2010/0121949 A1* | 5/2010 | Cho | H04L 41/12 | 709/224 |
| 2010/0161832 A1* | 6/2010 | Komine | H04L 41/0213 | 710/6 |
| 2011/0010441 A1* | 1/2011 | Gutierrez | H04L 41/046 | 709/223 |
| 2012/0075485 A1* | 3/2012 | Mizutani | H04M 1/72412 | 348/207.1 |
| 2012/0084432 A1* | 4/2012 | Soprovich | H04L 41/069 | 709/224 |
| 2013/0107741 A1* | 5/2013 | Huang | H04L 41/509 | 370/252 |
| 2014/0043633 A1* | 2/2014 | Hagiuda | G06F 3/1204 | 358/1.13 |
| 2014/0101487 A1* | 4/2014 | Kakadia | G06F 11/0712 | 714/37 |
| 2015/0295943 A1* | 10/2015 | Malachi | H04L 63/1416 | 726/24 |
| 2016/0306675 A1* | 10/2016 | Wiggers | G06F 9/4856 | |
| 2016/0352595 A1* | 12/2016 | Yermakov | H04L 41/0853 | |
| 2019/0050174 A1* | 2/2019 | Tajima | H04L 12/18 | |
| 2019/0227758 A1* | 7/2019 | Suzuki | H04L 63/1433 | |

* cited by examiner

RELAY DEVICE AND RELAY METHOD

CROSS-REFERENCE TO RELATED APPLICATIONS

This application is a National Stage application under 35 U.S.C. § 371 of International Application No. PCT/JP2019/031041, having an International Filing Date of Aug. 7, 2019, which claims priority to Japanese Application Serial No. 2018-154421, filed on Aug. 21, 2018. The disclosure of the prior application is considered part of the disclosure of this application, and is incorporated in its entirety into this application.

TECHNICAL FIELD

The present invention relates to a relay apparatus and a relay method.

BACKGROUND ART

A type and a configuration of a network apparatus group in a network in a carrier and a city are enormous and complicated by an increase in network demand, introduction of a new service, and disaggregation of large scale apparatuses. That is, the network becomes large in scale. Meanwhile, in an operation of the network apparatus group, not only recovery when a failure occurs, but also preventative maintenance for preventing the failure in advance by discerning a sign of the failure becomes increasingly important.

In preventative maintenance, it is important to periodically monitor a state of each network apparatus. Examples of a known monitoring technology for the preventative maintenance include Simple Network Management Protocol (SNMP), Command Line Interface (CLI), SYSLOG, and Telemetry. The monitoring technology for the preventative maintenance using the SNMP can be classified into SNMP trap and SNMP polling.

The SNMP trap is the monitoring technology for the preventative maintenance for notifying an operator of the network apparatus of information indicating the state of the network apparatus by the network apparatus. The notification from the network apparatus is performed when the network apparatus detects abnormality. The SNMP polling is the monitoring technology for the preventative maintenance for requesting and acquiring the information indicating the state of the network apparatus by the operator. The request from the operator is periodically transmitted. Details of the SNMP polling are disclosed in, for example, Non Patent Literature 1.

CITATION LIST

Non Patent Literature

Non Patent Literature 1: "RFC 2790—Host Resources MIB", [online], [searched on Aug. 15, 2018], Internet <URL: https://tools.ietf org/html/rfc2790>

SUMMARY OF THE INVENTION

Technical Problem

In the known monitoring system using the SNMP polling, when an operator issues an SNMP polling request to a plurality of network apparatuses to be monitored, each network apparatus that receives the request searches for Management Information Base (MIB) information within the host network apparatus, and return, as a response, an MIB value of the requested Object Identifier (OID). As a result, the request from the operator and the response from the network apparatus correspond to one-to-one.

When the network becomes large in scale, the number of network apparatuses increases, and exchange between the operator and the network apparatus increases. Thus, there are the following problems [1] to [3] in monitoring for the preventative maintenance using the SNMP polling in the large scale network.

Problem [1]: The number of times an alarm indicating a state abnormality occurs increases, and thus, an important alarm is drawn in another alarm and a risk that the operator overlooks the alarm is high.

Problem [2]: A load of an SNMP polling packet on the network increases.

Problem [3]: A dedicated monitoring server that manages a large amount of requests needs to be prepared, and thus, development cost of the monitoring system increases.

The present invention has been made in view of such circumstances, and an object of the present invention is to achieve monitoring for preventative maintenance using SNMP polling suitable for a large scale network.

Means for Solving the Problem

To solve the problems, a first aspect provides a relay apparatus for use in a system that monitors a plurality of network apparatuses by Simple Network Management Protocol (SNMP) polling, the relay apparatus including a request duplication unit configured to duplicate an SNMP request from an operator terminal, and a request transmission unit configured to transmit the duplicated SNMP requests to the plurality of network apparatuses all at once.

A fifth aspect provides a relay method in a relay apparatus for use in a system that monitors a plurality of network apparatuses by SNMP polling, the method including duplicating, by the relay apparatus, an SNMP request from an operator terminal, and transmitting, by the relay apparatus, the duplicated SNMP requests to the plurality of network apparatuses all at once.

According to the first and fifth aspects, the apparatus for which the operator terminal performs the SNMP polling is not the plurality of network apparatuses but the relay apparatus as the single apparatus, and the amount of information transmitted to the operator terminal is reduced. Thus, a monitoring load of the operator is reduced.

Accordingly, monitoring for preventative maintenance using the SNMP polling suitable for a large scale network can be realized.

According to a second aspect, the relay apparatus according to the first aspect further includes a storage unit configured to store an apparatus information DB that retains a response value of the SNMP polling which is included in a first SNMP response from each of the plurality of network apparatuses for each of the plurality of network apparatuses and a monitoring policy DB that retains a monitoring policy when each of the plurality of network apparatuses is monitored, and a response calculation unit configured to calculate an operator response value for the operator terminal from the response value retained in the apparatus information DB according to the monitoring policy retained in the monitoring policy DB.

According to a sixth aspect, in the relay method according to the fifth aspect, a storage unit of the relay apparatus is configured to store an apparatus information DB that retains a response value of the SNMP polling which is included in a first SNMP response from each of the plurality of network apparatuses for each plurality of network apparatuses and a monitoring policy DB that retains a monitoring policy when each of the plurality of network apparatuses is monitored, and the relay method further includes calculating, by the relay apparatus, an operator response value for the operator terminal from the response value retained in the apparatus information DB according to the monitoring policy retained in the monitoring policy DB.

According to the second and sixth aspects, the relay apparatus can provide the response value desired by the operator to the operator by calculating the operator response value according to the monitoring policy.

According to a third aspect, the relay apparatus according to the second aspect further includes a response transmission unit configured to transmit a second SNMP response including the operator response value and an identifier of a first network apparatus of the plurality of network apparatuses to the operator terminal when the first network apparatus is a network apparatus of the plurality of network apparatuses that transmits the first SNMP response including the response value used in the calculation of the operator response value.

According to a seventh aspect, the relay method according to the sixth aspect further includes transmitting, by the relay apparatus, a second SNMP response including the operator response value and an identifier of a first network apparatus of the plurality of network apparatuses to the operator terminal when the first network apparatus is a network apparatus of the plurality of network apparatuses that transmits the first SNMP response including the response value used in the calculation of the operator response value.

According to the third and seventh aspects, the relay apparatus can show the network apparatus that provides the operator response value to the operator, and the operator can easily discern the network apparatus to be monitored.

According to a fourth aspect, in the relay apparatus according to the third aspect, when a second network apparatus of the plurality of network apparatuses is a network apparatus of the plurality of network apparatuses that does not transmit the first SNMP response even though the SNMP request is retransmitted by a predetermined number of times, the response transmission unit transmits a third SNMP response including an identifier of the second network apparatus to the operator terminal.

According to an eighth aspect, in the relay method according to the seventh aspect, when a second network apparatus of the plurality of network apparatuses is a network apparatuses of the plurality of network apparatuses that does not transmit the first SNMP response even though the SNMP request is retransmitted by a predetermined number of times, the relay apparatus transmits a third SNMP response including an identifier of the second network apparatus to the operator terminal by the relay apparatus in the transmitting of the response.

According to the fourth and eighth aspects, the relay apparatus can show the network apparatus that does not provide the SNMP response to the operator, and the operator can easily discern the network apparatus to be monitored.

Effects of the Invention

According to the present invention, it is possible to realize monitoring for preventative maintenance using SNMP polling suitable for a large scale network.

DESCRIPTION OF EMBODIMENTS

Figure 1:
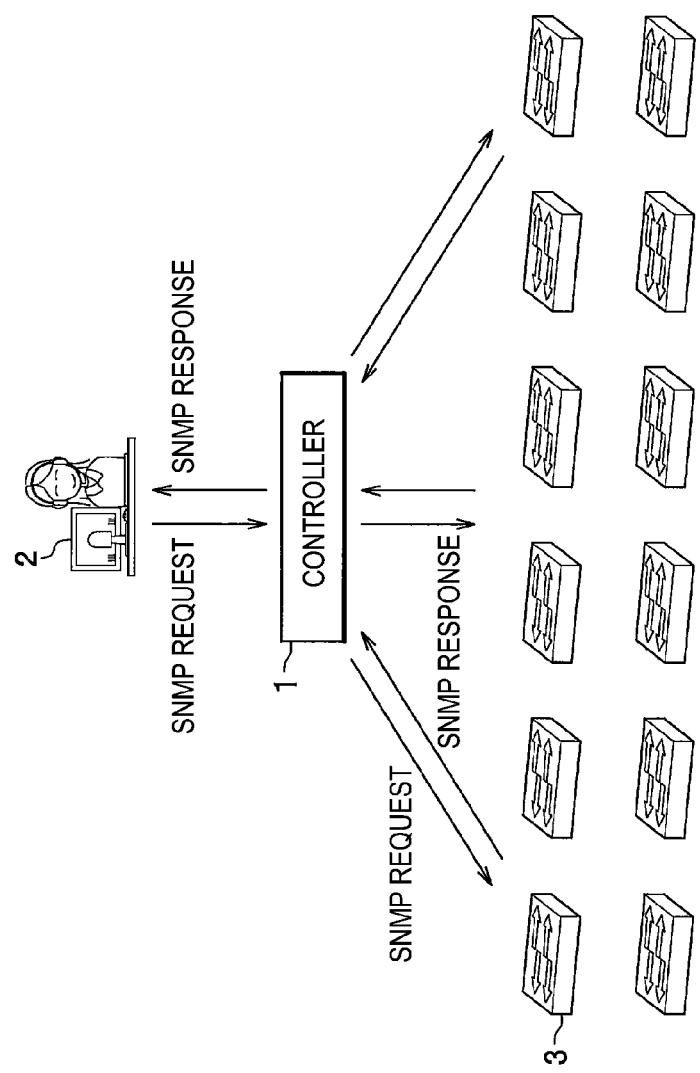
FIG. 1 is a functional configuration diagram of a monitoring system of the present embodiment.

Hereinafter, an embodiment for carrying out the present invention (hereinafter, referred to as a "present embodiment") will be described referring to the drawings.

Configuration

As illustrated in FIG. 1, a monitoring system of the present embodiment includes a controller 1, an operator terminal 2, and a plurality of monitored apparatuses 3. For the sake of convenience in description, the monitored apparatus may be referred to as a "network apparatus" or simply a "apparatus". The controller 1 (relay apparatus), the operator terminal 2, and the apparatuses 3 are connected to communicate with each other.

The controller 1 is a relay apparatus that relays the exchange between the operator terminal 2 and the apparatus 3. The controller 1 is a computer including hardware such as an input/output unit including an input/output interface (I/F), a storage unit including a hard disk, a flash memory, and a random access memory (RAM), and a control unit including a central processing unit (CPU). The control unit executes the above-described processing by, for example, expanding programs stored in the storage unit in a storage region of the storage unit and executing the programs. The controller 1 according to the present embodiment may achieve cooperation of such software and hardware. The controller 1 will be described in detail below.

The operator terminal 2 is a console operated by an operator who monitors a state of the apparatus 3, and is an SNMP manager.

The monitored apparatus 3 is a network apparatus arranged in a large scale network, and is an SNMP agent.

The operator terminal 2 transmits a request in SNMP polling, that is, an SNMP request to the controller 1. The controller 1 duplicates the received SNMP request, and transmits the duplicated SNMP requests to the plurality of apparatuses 3 registered in advance all at once. When a response in the SNMP polling, that is, an SNMP response is received from each of the apparatuses 3, the controller 1 aggregates the received SNMP responses, and transmits the SNMP responses to the operator terminal 2.

Details of Controller 1

Figure 2:
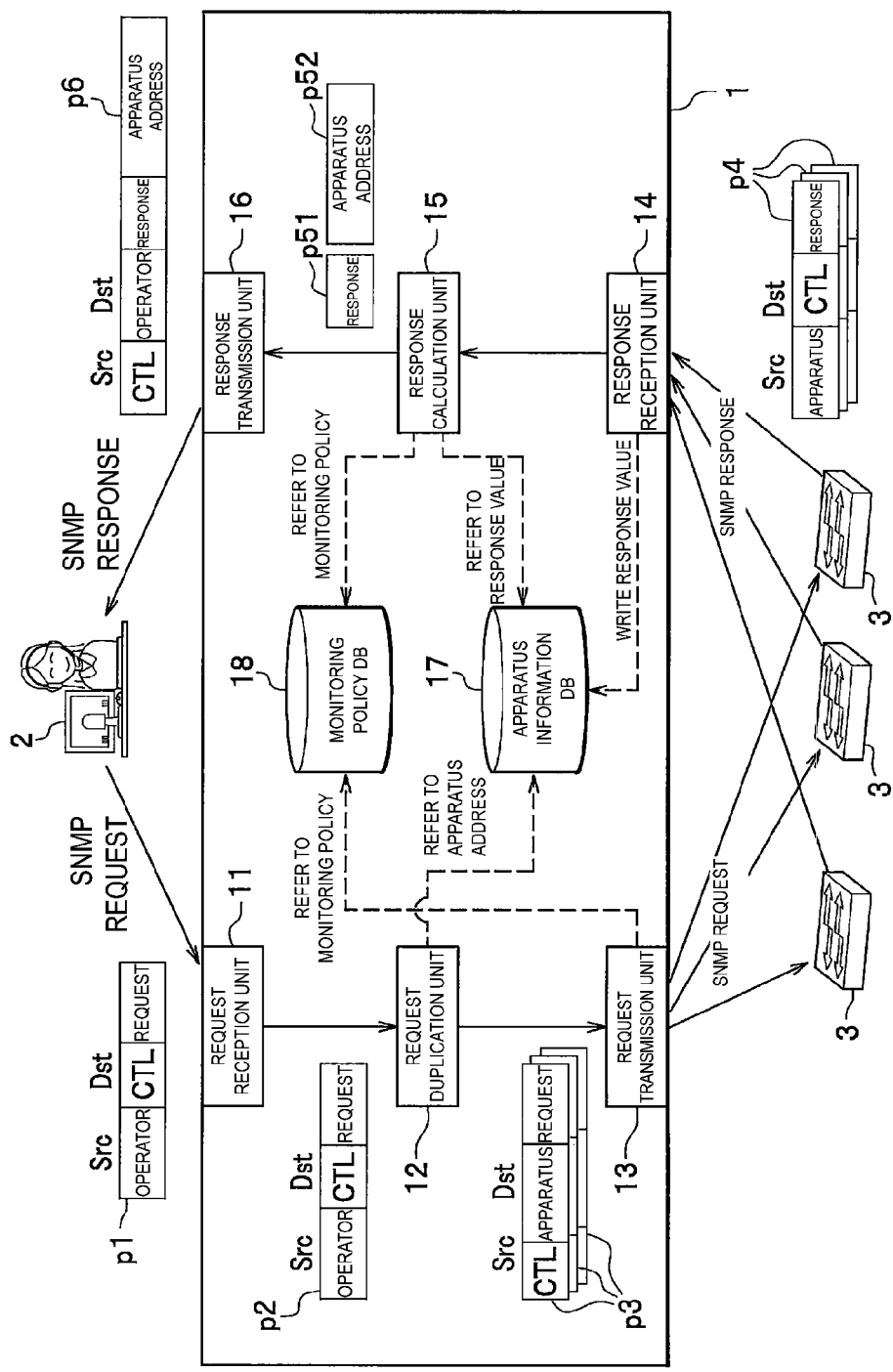
FIG. 2 is a functional configuration diagram of a controller of the present embodiment.

As illustrated in FIG. 2, the controller 1 includes a request reception unit 11, a request duplication unit 12, a request transmission unit 13, a response reception unit 14, a response calculation unit 15, a response transmission unit 16, an apparatus information DB 17, and a monitoring policy DB 18. "DB" is an abbreviation for a database. The apparatus information DB 17 and the monitoring policy DB 18 are stored in the storage unit of the controller 1.

Apparatus Information DB 17

The apparatus information DB 17 is a database that retains information in which an IP address of the apparatus 3 and a response value of the SNMP polling are associated. The information retained in the apparatus information DB 17 is present for each apparatus of the plurality of apparatuses 3 registered in advance.

Monitoring Policy DB 18

The monitoring policy DB 18 is a database that retains monitoring items for monitoring the apparatuses 3, specifically, information in which an OID and contents of a monitoring policy are associated. For example, when the monitoring item is "CPU usage" and the content of the associated monitoring policy is "maximum value", a monitoring policy for monitoring by using the apparatus 3 having the maximum CPU usage among the apparatuses 3 to be monitored and the maximum CPU usage is constructed. When the monitoring item is "CPU usage" and the content of the associated monitoring policy is "average value", a monitoring policy for monitoring by using an average value of the CPU usages of the apparatuses 3 to be monitored is constructed.

Request Reception Unit 11

The request reception unit 11 receives the SNMP request from the operator terminal 2, and outputs the received SNMP request to the request duplication unit 12. The SNMP request from the operator terminal 2 can be implemented as a packet p1. The packet p1 stores an IP address of the operator terminal 2 (referred to as an "operator" in FIG. 1) in a transmission source header (Src), stores an IP address of the controller 1 (referred to as a "CTL" in FIG. 1) in a destination header (Dst), and stores a request value (referred to as a "request" in FIG. 1) in a payload portion. A packet p2 output to the request duplication unit 12 is identical to the packet p1.

Request Duplication Unit 12

The request duplication unit 12 duplicates the SNMP request input from the request reception unit 11, and outputs the duplicated SNMP request to the request transmission unit 13. The duplicated SNMP request can be implemented as a packet p3. The packet p3 stores an IP address of the controller 1 ("CTL") in a transmission source header (Src), stores an IP address of each of the apparatuses 3 retained in the apparatus information DB 17 (referred to as an "apparatus" in FIG. 1) in a destination header (Dst), and stores a request value (referred to as a "request" in FIG. 1. the "requests" of the packets p1 and p2 are identical) in a payload portion. The packet 3 is created for each apparatus 3. The request duplication unit 12 refers to the apparatus information DB 17, acquires an IP address of each of the apparatuses 3 (referred to as an "apparatus address" in FIG. 1), and stores the acquired IP address in the destination header (Dst) of the packet p3.

Request Transmission Unit 13

The request transmission unit 13 transmits the SNMP requests duplicated by the request duplication units 12 to the apparatuses 3 all at once. When the requests are transmitted all at once, the request transmission unit 13 refers to the monitoring policy DB 18, and follows the monitoring policy for each OID. The request transmission unit 13 transmits the corresponding packet p3 to the apparatus 3 identified by the IP address stored in the destination header (Dst) of the packet p3 according to the monitoring policy.

The request transmission unit 13 refers to the apparatus information DB 17 for each predetermined timeout (T.O (TimeOut)) time, and retransmits the SNMP request to the apparatus 3 of which the response value of the SNMP polling is null. The retransmission can be executed only a predetermined number of times (the number of times of retry (upper limit value of the number of times of retransmission)).

Response Reception Unit 14

The response reception unit 14 receives an SNMP response (a first SNMP response) from each of the apparatuses 3, and notifies the response calculation unit 15 of the end of the SNMP response. The SNMP response from the apparatus 3 may be implemented as a packet p4. Each packet p4 stores an IP address of each of the apparatuses 3 ("apparatus") in a transmission source header (Src), stores an IP address of the controller 1 (referred to as a "CTL") in a destination header (Dst), and stores a response value (referred to as a "response" in FIG. 1) for each apparatus 3 in a payload portion.

The response reception unit 14 reads the response value of the SNMP polling from the SNMP response received from each of the apparatuses 3, and writes the response value to the apparatus information DB 17 for each apparatus 3. The read response value is identical to the response value stored in the payload portion of the packet p4. When the response value is not received from a specific apparatus 3 even after a time corresponding to T.O×number of times of retry elapses, the response reception unit 14 writes the T.O value (meaning of no response value) as the response value of the SNMP polling of the apparatus 3 in the apparatus information DB 17.

Response Calculation Unit 15

The response calculation unit 15 refers to the apparatus information DB 17 and the monitoring policy DB 18 according to the notification from the response reception unit 14, and calculates a response value for the operator (operation response value) following the monitoring policy. For example, when the response calculation unit 15 refers to the apparatus information DB 17 but finds no apparatus 3 of which the response value is the T.O value, the response calculation unit 15 refers to the monitoring policy DB 18 and calculates the operator response value from the response value retained in the apparatus information DB 17. The calculated operator response value may be, for example, a value for each apparatus 3, or may be one or more values for all of the apparatuses 3.

The response calculation unit 15 outputs the calculated operator response value together with the IP address of the corresponding apparatus 3 to the response transmission unit 16. In FIG. 1, the operator response value is illustrated as a "response" p51, and the IP address of the corresponding apparatus 3 is illustrated as an "apparatus address" p52. The output of the IP address of the corresponding apparatus 3 to the response transmission unit 16 is optional, and may not be applied depending on the contents of the monitoring policy.

For example, when the monitoring item of the monitoring policy DB 18 is "CPU usage" and the monitoring policy is "maximum value", the response calculation unit 15 outputs the maximum value of the CPU usage retained in the apparatus information DB 17 and the IP address of the apparatus 3 of which the CPU usage has the maximum value to the response transmission unit 16.

For example, when the monitoring item of the monitoring policy DB 18 is "CPU usage" and the monitoring policy is "average value", the response calculation unit 15 calculates an average value of the CPU usages of the apparatuses 3 retained in the apparatus information DB 17, and outputs the calculated average value to the response transmission unit 16. When the response calculation unit 15 refers to the apparatus information DB 17 and finds at least one apparatus 3 of which the response value is the T.O value, the response calculation unit 15 can output the IP address of the found apparatus(es) 3 to the response transmission unit 16.

Response Transmission Unit 16

The response transmission unit 16 transmits, as an SNMP response (second SNMP response) to the SNMP request from the operator terminal 2, the response value output by the response calculation unit 15 and the IP address (identifier) of the corresponding apparatus 3 (first network apparatus) to the operator terminal 2. The SNMP response to the operator terminal 2 can be implemented as a packet p6. The packet p6 stores an IP address of the controller 1 ("CTL") in a transmission source header (Src), stores an IP address of the operator terminal 2 ("operator") in a destination header (Dst), and stores a response value (referred to as a "response" in FIG. 1) and an IP address of the corresponding apparatus 3 (referred to as "apparatus address" in FIG. 1) in a payload portion.

The response value of the payload portion of the packet p6 is an operator response value indicated by the "response" p51. The IP address of the corresponding apparatus 3 in the payload portion of the packet p6 is the IP address of the corresponding apparatus 3 indicated by the "apparatus address" p52. Depending on the contents of the monitoring policy, for example, the response transmission unit 16 may refer to the apparatus information DB 17, acquire the IP addresses of all the apparatuses 3 registered in advance, and transmit the packet p6 to the operator terminal 2 for each apparatus 3. When "apparatus address" p52 is empty, the response transmission unit 16 can transmit, as the SNMP response, the packet p6 without the IP address of the apparatus 3 to the operator terminal 2.

When there is at least one apparatus 3 of which the response value is the T.O value, the response transmission unit 16 transmits an SNMP response (third SNMP response) which is input from the response calculation unit 15 and includes the IP address of the apparatus 3 indicating the T.O value to the operator terminal 2. The "apparatus 3 of which the response value is the T.O value" refers to the apparatus 3 of which the SNMP response is not received by the controller 1 (second network apparatus).

Processing

Figure 3:
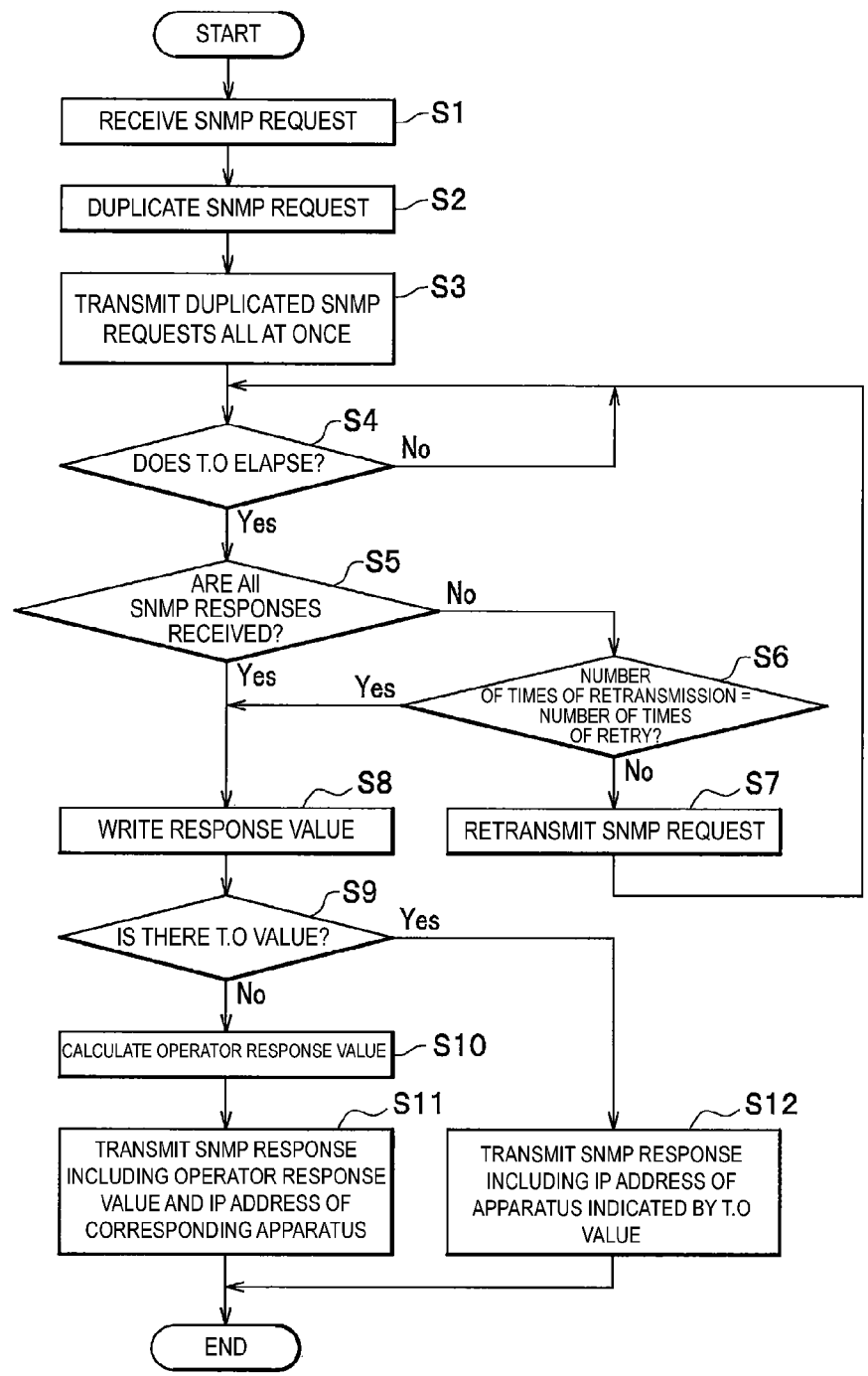
FIG. 3 is a flowchart illustrating SNMP polling processing.

SNMP polling processing executed by the controller 1 of the present embodiment will be described with reference to FIG. 3. Prior to the execution of this processing, the operator terminal 2 registers the apparatus 3 to be monitored in the apparatus information DB 17 in advance. The operator terminal 2 registers the monitoring policy for each monitoring item in the monitoring policy DB 18 in advance. Basically, the monitoring policy registered in the monitoring policy DB 18 becomes a policy for obtaining a response desired by the operator.

First, the controller 1 receives the SNMP request from the operator terminal 2 by the request reception unit 11 (step S1). Subsequently, the controller 1 duplicates the received SNMP request by the request duplication unit 12 (step S2). Subsequently, the controller 1 transmits the duplicated SNMP requests to the apparatuses 3 by the request transmission unit 13 all at once (step S3). The SNMP requests transmitted all at once follow the monitoring policy for each OID in the monitoring policy DB 18. Each of the apparatuses 3 that receive the SNMP requests searches for MIB information within the apparatus 3 itself, and returns, as the response, a MIB value of the requested OID.

After the SNMP requests are transmitted all at once, the controller 1 determines, by using the response reception unit 14, whether a time elapses by T.O (step S4). Step S4 is interrupt determination processing in which the subsequent processing is not executed while the time has not elapsed by T.O (No in step S4). If the time elapses (Yes in step S4), the controller 1 determines whether the SNMP requests from all the apparatuses 3 to be monitored, that is, all the SNMP requests are received by the response reception unit 14 (step S5).

If all the SNMP requests are not received (No in step S5), the controller 1 determines, by using the response reception unit 14, whether the number of times the SNMP request is retransmitted by the request transmission unit 13 matches the number of times of retry (step S6). If the number of times of the retransmission does not match the number of times of retry (No in step S6), the number of times of retransmission does not reach an upper limit value, and the controller 1 retransmits, by using the request transmission unit 13, the SNMP request to the apparatus 3 that does not transmit the SNMP response (step S7). After the retransmission, the response reception unit 14 waits for reception of all the SNMP responses until the time elapses by T.O (steps S4 and S5).

If all the SNMP requests are received (Yes in step S5), the controller 1 writes the response value included in the received SNMP response to the apparatus information DB 17 for each apparatus 3 by the response reception unit 14 (step S8). Alternatively, if the number of times of retransmission of the SNMP request by the request transmission unit 13 matches the number of times of retry while all the SNMP requests are not received (Yes in step S6), the controller 1 writes, by using the response reception unit 14, the T.O value as the response to the apparatus information DB 17 for the specific apparatus 3 that cannot receive the SNMP request (step S8). The response reception unit 14 notifies the response calculation unit 15 of the end of the SNMP response by writing the response value to all the apparatuses 3.

Subsequently, by using the response calculation unit 15, the controller 1 refers to the apparatus information DB 17, and determines whether there is the T.O value (step S9). If there is no T.O value (No in step S9), the controller 1 refers to the monitoring policy DB 18 by using the response calculation unit 15, and calculates, by using the response calculation unit 15, the operator response value from the response value retained in the apparatus information DB 17 according to the monitoring policy (step S10).

Subsequently, by using the response transmission unit 16, the controller 1 transmits the SNMP response including the calculated operator response value and the IP address of the corresponding apparatus 3 to the operator terminal 2 (step S11). The "corresponding apparatus 3" refers to the apparatus 3 that transmits the SNMP response including the response value used in the calculation of the operator response value to the controller 1. After step S11, the SNMP polling processing of FIG. 3 is ended.

On the other hand, if there is at least one T.O value (Yes in step S9), the controller 1 transmits, by the response transmission unit 16, the SNMP response including the IP address of the apparatus 3 indicating the T.O value to the operator terminal 2 (step S12). After step S12, the SNMP polling processing of FIG. 3 is ended.

Conclusion

According to the present embodiment, the apparatus for which the operator terminal 2 performs the SNMP polling is not the plurality of monitored apparatuses 3 but the controller 1 as the single apparatus, and the amount of information transmitted to the operator terminal 2 is reduced. Thus, a monitoring load of the operator is reduced.

Accordingly, monitoring for preventative maintenance using the SNMP polling suitable for a large scale network can be realized.

As for the problem [1] discussed in the present specification, the amount of information transmitted to the operator terminal 2 is reduced, and the number of times of occurrence of an alarm notified to the operator terminal 2 is also reduced. As a result, a risk that the operator looks off an important alarm is greatly reduced. In a network in which large scale apparatuses are disaggregated, a load and a behavior of each apparatus 3 are assumed to be similar before and after the disaggregation, and thus, the important alarm is easy to be discerned even after the disaggregation, and the risk of looking off the important alarm is still greatly reduced.

As for the problem [2] discussed in the present specification, the SNMP polling between the operator terminal 2 and the controller 1 is performed only for the single apparatus, and thus, it is possible to reduce a load on the network by arranging the controller 1 in the vicinity of the plurality of apparatuses 3.

As for the problem [3] discussed in the present specification, the controller 1 merely duplicates the SNMP request from the operator terminal 2, and thus, management cost of the SNMP request can be reduced. It is not necessary to store the SNMP response from the apparatus 3, and thus, management cost of the SNMP response can also be reduced. Accordingly, the monitoring for the preventative maintenance using the SNMP polling can be implemented by using a small scale general-purpose server and a script, and thus, it is not necessary to prepare a dedicated monitoring server.

According to the present embodiment, the controller 1 can provide the response value desired by the operator to the operator by calculating the operator response value according to the monitoring policy.

According to the present embodiment, the controller 1 can show the apparatus 3 that provides the operator response value to the operator, and the operator can easily discern the apparatus 3 to be monitored.

According to the present embodiment, the controller 1 can show the apparatus 3 that does not transmit the SNMP response to the operator, and the operator can easily discern the apparatus 3 to be monitored.

Others (a) When the response calculation unit 15 refers to the apparatus information DB 17 and finds at least one apparatus 3 of which the response value is the T.O value, the response calculation unit 15 may calculate the operator response value from the response value other than the T.O value depending on the contents of the monitoring policy. At this time, the response calculation unit 15 may output the IP address of the apparatus 3 that provides the response value other than the T.O value together with the calculated operator response value to the response transmission unit 16. The response transmission unit 16 notifies the operator terminal 2 of the IP address.

(b) A technology obtained by suitably combining various technologies described in each of the present embodiments may be realized.

REFERENCE SIGNS LIST

1 Controller (relay apparatus)
2 Operator terminal
3 Monitored apparatus (network apparatus: apparatus)
11 Request reception unit
12 Request duplication unit
13 Request transmission unit
14 Response reception unit
15 Response calculation unit
16 Response transmission unit
17 Apparatus information DB
18 Monitoring policy DB

The invention claimed is:

1. A relay apparatus for use in a system that monitors a plurality of network apparatuses by Simple Network Management Protocol (SNMP) polling, the relay apparatus comprising:
  a request duplication unit, including one or more processors, configured to duplicate an SNMP request received from an operator terminal to obtain a plurality of duplicated SNMP requests, wherein each of the plurality of duplicated SNMP requests includes an IP address of a corresponding network apparatus in a destination header;
  a request transmission unit, including one or more processors, configured to transmit the plurality of duplicated SNMP requests to the plurality of network apparatuses all at once;
  a storage medium configured to store
    an apparatus information database (DB) that retains a response value of the SNMP polling which is included in a first SNMP response from each of the plurality of network apparatuses, and
    a monitoring policy database (DB) that retains a monitoring policy when each of the plurality of network apparatuses is monitored; and
  a response calculation unit, including one or more processors, configured to calculate an operator response value for the operator terminal from the response value for each of the plurality of network apparatuses retained in the apparatus information DB according to the monitoring policy retained in the monitoring policy DB, wherein the operator response value is returned to the operator terminal.

2. The relay apparatus according to claim 1, further comprising:
  a response transmission unit, including one or more processors, configured to transmit a second SNMP response including the operator response value and an identifier of a first network apparatus of the plurality of network apparatuses to the operator terminal when the first network apparatus is a network apparatus of the plurality of network apparatuses that transmits the first SNMP response including a response value used in the calculation of the operator response value.

3. The relay apparatus according to claim 2, wherein, when a second network apparatus of the plurality of network apparatuses is a network apparatus of the plurality of network apparatuses that does not transmit the first SNMP response even though the SNMP request is retransmitted by a predetermined number of times, the response transmission unit is configured to transmit a third SNMP response including an identifier of the second network apparatus to the operator terminal.

4. A relay method in a relay apparatus for use in a system that monitors a plurality of network apparatuses by SNMP polling, the method comprising:
  duplicating, by the relay apparatus, an SNMP request received from an operator terminal to obtain a plurality of duplicated SNMP requests, wherein each of the plurality of duplicated SNMP requests includes an IP address of a corresponding network apparatus in a destination header;
  transmitting, by the relay apparatus, the plurality of duplicated SNMP requests to the plurality of network apparatuses all at once, wherein the relay apparatus includes a storage medium configured to store
    an apparatus information database (DB) that retains a response value of the SNMP polling which is included in a first SNMP response from each of the plurality of network apparatuses, and
    a monitoring policy database (DB) that retains a monitoring policy when each of the plurality of network apparatuses is monitored; and
  calculating, by the relay apparatus, an operator response value for the operator terminal from the response value for each of the plurality of network apparatuses retained in the apparatus information DB according to the monitoring policy retained in the monitoring policy DB, wherein the operator response value is returned to the operator terminal.

5. The relay method according to claim 4, further comprising:
  transmitting, by the relay apparatus, a second SNMP response including the operator response value and an identifier of a first network apparatus of the plurality of network apparatuses to the operator terminal when the first network apparatus is a network apparatus of the plurality of network apparatuses that transmits the first SNMP response including a response value used in the calculation of the operator response value.

6. The relay method according to claim 5, further comprising:
  when a second network apparatus of the plurality of network apparatuses is a network apparatuses of the plurality of network apparatuses that does not transmit the first SNMP response even though the SNMP request is retransmitted by a predetermined number of times, transmitting, by the relay apparatus, a third SNMP response including an identifier of the second network apparatus to the operator terminal by the relay apparatus.

* * * * *